United States Patent
Padhi et al.

(10) Patent No.: US 6,178,381 B1
(45) Date of Patent: Jan. 23, 2001

(54) METHOD OF GEOPHYSICAL EXPLORATION

(75) Inventors: Trilochan Padhi; Thomas Kennedy Holley, both of Houston, TX (US)

(73) Assignee: Shell Oil Company, Houston, TX (US)

( * ) Notice: Under 35 U.S.C. 154(b), the term of this patent shall be extended for 0 days.

(21) Appl. No.: 09/238,116

(22) Filed: Jan. 27, 1999

Related U.S. Application Data (60) Provisional application No. 60/072,665, filed on Jan. 27, 1998.

(51) Int. Cl.[7] .................................................... G01V 1/28
(52) U.S. Cl. .............................................................. 702/18
(58) Field of Search ................................ 702/14, 16, 18; 367/72, 73, 74

(56) References Cited

U.S. PATENT DOCUMENTS

| | | | |
|---|---|---|---|
| 4,839,869 | 6/1989 | Corcoran | 367/53 |
| 4,942,557 | 7/1990 | Seriff | 367/15 |
| 5,274,603 | 12/1993 | Zibilich, Jr. et al. | 367/20 |

OTHER PUBLICATIONS

T. Padhi and T. K. Holley, "Wide azimuths—why not?", Feb. 1997, *The Leading Edge*, pp. 175–177.

"Global spending on 4C data could hit $600 million by 2005", Aug. 1998, *Offshore*, p. 51.

Victor Schmidt, "Good bottom couple required for 4D/4C seabed surveys", Aug. 1998, *Offshore*, pp. 74, 131.

A. Canning and G. H. F. Gardner, "Another look at the question of azimuth", Jul. 1996, *The Leading Edge*, pp. 821–823.

*Primary Examiner*—Donald E. McElheny, Jr.

(57) ABSTRACT

A method is disclosed for processing three dimensional seismic data, acquired with land-like geometies. The method comprises sorting the seismic data into single fold data sets which approximate minimal data sets and DMOing or migrating the single fold data sets to form minimal data set images. In some aspects the method further comprises sorting the minimal data set images obtained into gathers which are sorted by surface location, and also may be sorted by pseudo offset.

21 Claims, 6 Drawing Sheets

METHOD OF GEOPHYSICAL EXPLORATION

This application claims the benefit of U.S. Provisional Application No. 60/072,665, filed Jan. 27, 1998, the entire disclosure of which is hereby incorporated by reference.

FIELD OF THE INVENTION

The present invention relates to the processing of three dimensional (3D) seismic data. The present invention more particularly relates to a method for processing 3D seismic data using minimal data sets and a method for determining whether seismic data can be decomposed into subsets which approximate minimal data sets.

BACKGROUND OF THE INVENTION

Canning and Gardner contend in a July 1996 article in "The Leading Edge" that a narrow range of azimuths is highly desirable for good prestack imaging. Their argument is based on their observation that migration of wide-azimuth seismic data can generate undesirable artifacts in the migrated output unless very costly survey designs are used. What is desired is a cost-effective method of geophysical exploration which uses a relatively inexpensive seismic survey design to collect wide-azimuth data and which reduces the occurrence of undesirable artifacts when prestack migration is carried out on the wide-azimuth data.

SUMMARY

We have unexpectedly discovered a method of geophysical exploration that provides a cost-effective method of processing wide-azimuth seismic data using prestack migration, without producing the undesirable artifacts which often occur with conventional seismic acquisition and processing techniques.

One aspect of the invention involves the design and/or acquisition of a seismic survey that is constructed from a superposition of minimal data sets.

Another aspect of the invention involves the use of a diagnostic to assess to what extent a real seismic survey design (e.g. one containing gaps and positioning errors) can be approximately decomposed into minimal data sets. In this diagnostic, an ideal minimal data set is one where the trace coordinates lie on a 2-D hyperplane in a 4-D space of acquisition coordinates.

A third aspect of the invention involves seismic processing methods which exploit minimal data set principles to suppress noise in three dimensional (3D) seismic data acquired with land like geometries (i.e. wide azimuth seismic data acquired using conventional land seismic acquisition techniques or other techniques such as ocean bottom cable acquisition techniques which acquire relatively wide azimuth data). The methods include minimal data set slotting of migration input traces (as opposed to conventional common offset slotting) and ordering of traces in minimal data set prestack migrated common output gathers to reveal residual moveout velocity.

Numerous other advantages and features of the present invention will become readily apparent from the following detailed description of the invention, the embodiments described therein, and the accompanying FIGS.

BRIEF DESCRIPTION OF THE FIGURES

FIG. 1 shows that the response is a curve (or "wire") which is tangent to the surface ABCD representing the reflector as imaged by the DMO operation. In FIG. 1 S denotes the shot location for the trace and G denotes the receiver location for the trace.

FIG. 2 shows that the DMO wires define a "channel" which is tangent to the reflector ABCD along a line.

FIG. 4 depicts an asymmetric slash survey acquisition design. The receiver lines G run parallel to one another and the shot lines S intersect the receiver lines. This type of acquisition design can be decomposed into minimal data sets having a slash cross-spread geometry.

DETAILED DESCRIPTION

The method of this invention involves the design of a seismic survey that can be decomposed into "minimal data sets" which are then processed using techniques described below in order to provide a cost-effective means for acquiring and processing wide-azimuth seismic data. A minimal data set is the smallest amount of data that can adequately image a reflector (or at least a reasonable piece of one). Further requirements for a minimal data set of this invention are set forth below in the discussion of minimal data sets.

Figure 4:
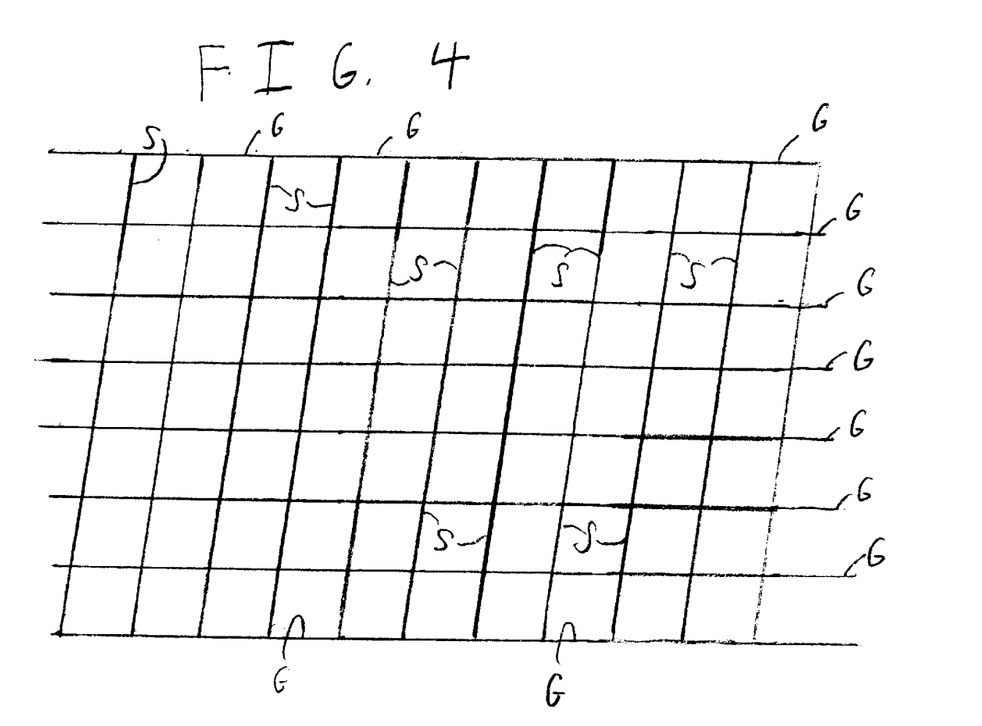
Figure 5:
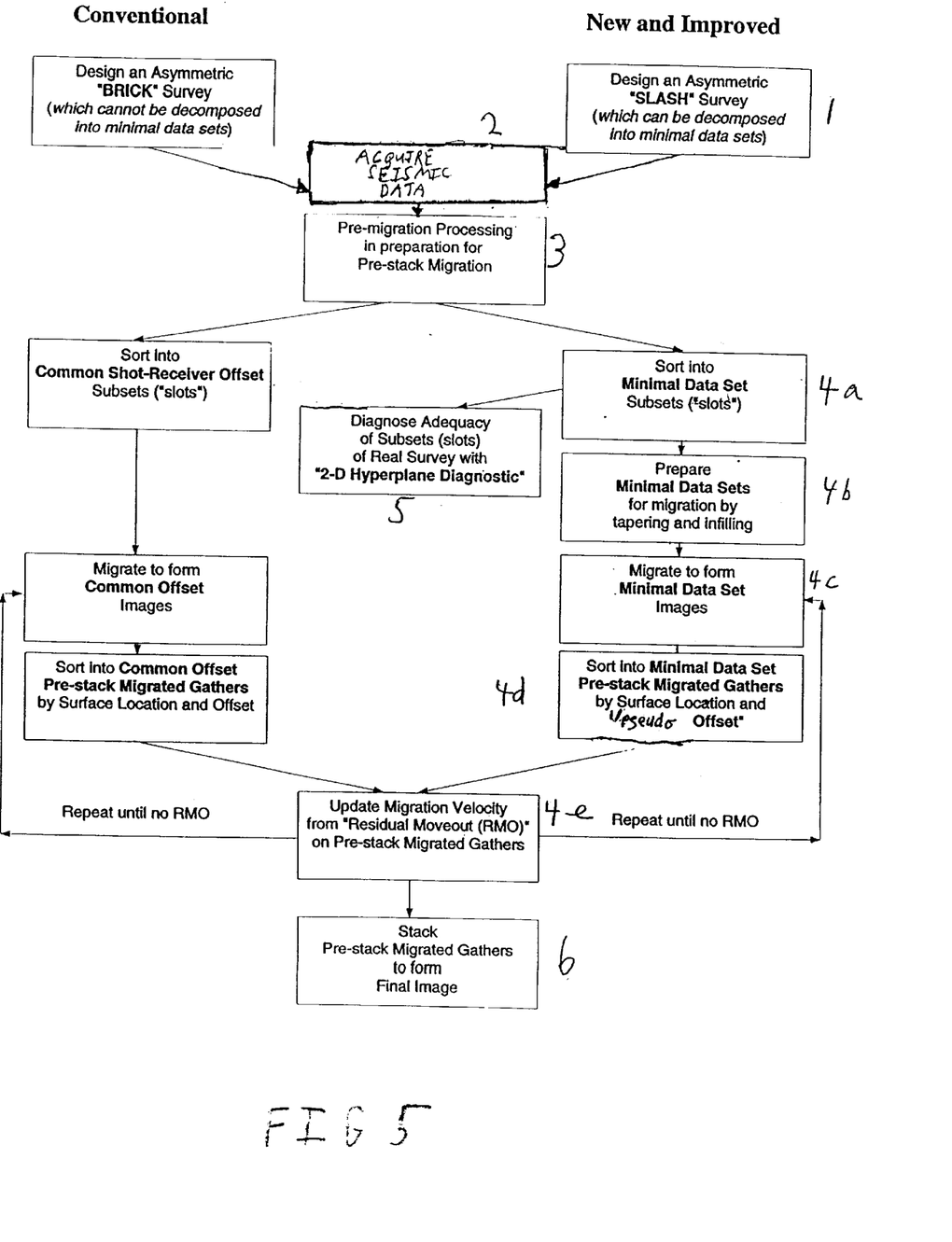
FIG. 5 is a block diagram showing several steps, which may be used, in processing seismic data according to the current invention.

FIG. 5 is a flow diagram that shows several of the key steps that may be used in the invention. FIG. 5 also compares the steps used in the current invention with the steps commonly used in conventional seismic acquisition and processing. Following is a description of the steps depicted in FIG. 5:

Step 1 is the design of the seismic survey. The survey is preferably designed so that it is constructed from a superposition of minimal data sets. One type of survey design that fills this criterion is an asymmetric "Slash" survey design as shown in FIG. 4. The seismic survey should be designed so that the minimal data sets have sufficient overlap to provide an adequate signal-to-noise ratio.

Step 2 is carrying out the seismic survey and acquiring the seismic data. It should be noted that the actual survey design utilized may vary from the ideal survey design. This occurs due to several factors including, but not limited to, permitting problems, the need to avoid noise sources that may be present in the area of the survey, platform avoidance in marine surveys, and positioning errors that can occur while conducting the survey.

Step 3 (prior art) is carrying out pre-migration processing. This step involves common procedures such as noise filtration and deconvolution techniques that may be necessary.

Step 4a through 4e describe processing techniques utilized by the invention which are unique to processing seismic data utilizing minimal data sets. In step 4a the seismic data is sorted into single fold subsets called minimal data sets. The subsets are constructed so that they have sufficient overlap with the adjacent subsets. Determining how much overlap will depend on the amount of noise suppression that is necessary. It is typical to use as little overlap as is necessary to obtain the desired signal to noise ratios. Step 4d includes using prestack migrated gathers sorted by surface location and pseudo offset (described below) to estimate residual moveout ("RMO"). The technique is more fully described below.

Step 5 involves the use of a diagnostic to assess to what extent the real seismic survey approximates a collection of minimal data sets. In this diagnostic (as more fully described below), an ideal minimal data set is a data set whose trace coordinates form a 2-D hyperplane in a 4-D space of acquisition coordinates.

Step 6 involves the stacking of the minimal data sets into a final image. Multiple reflections and other noises are further suppressed in this stacking process.

The above steps and general considerations regarding acquisition and processing of seismic data in accordance with the invention are discussed further below.

A. Minimal Data Sets

Figure 1:
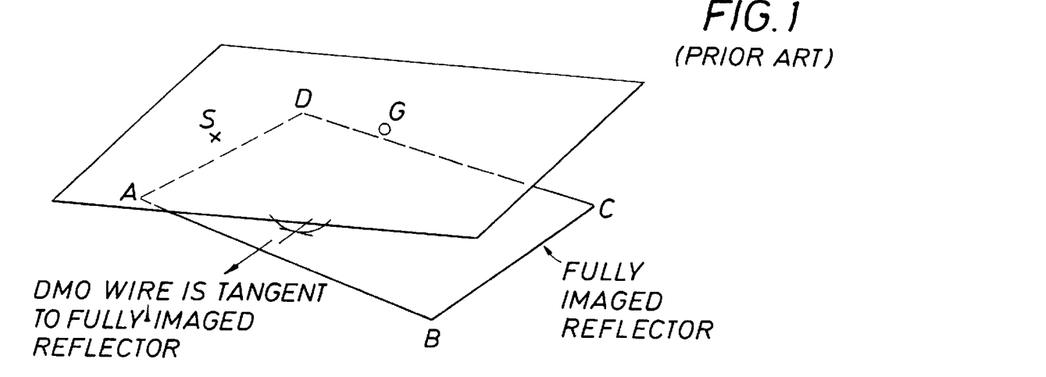
FIG. 1 (prior art) depicts the response of a seismic event on a single trace after DMO has been performed.
Figure 2:
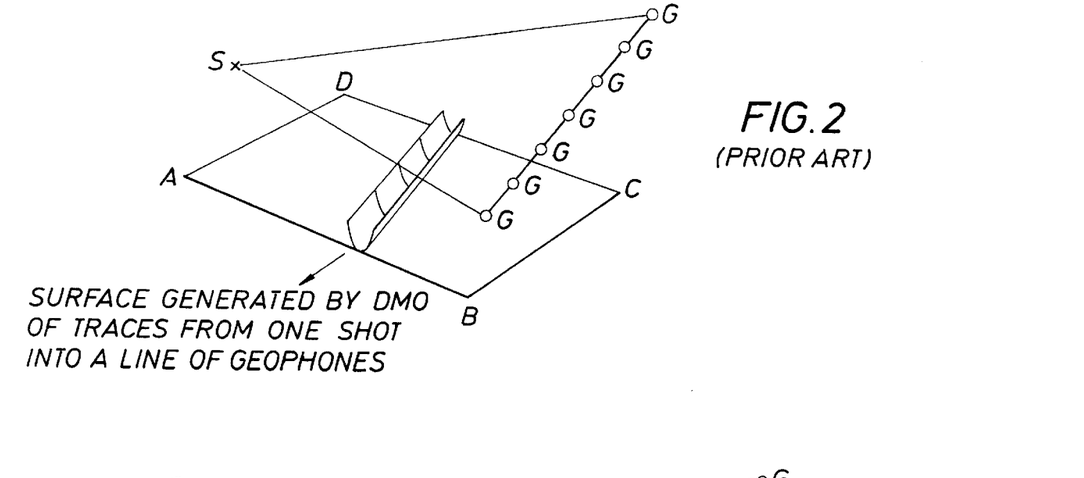
FIG. 2 (prior art) depicts the response of a seismic event on several traces acquired from a single source S fired into a line of receivers G, after DMO has been performed.
Figure 3:
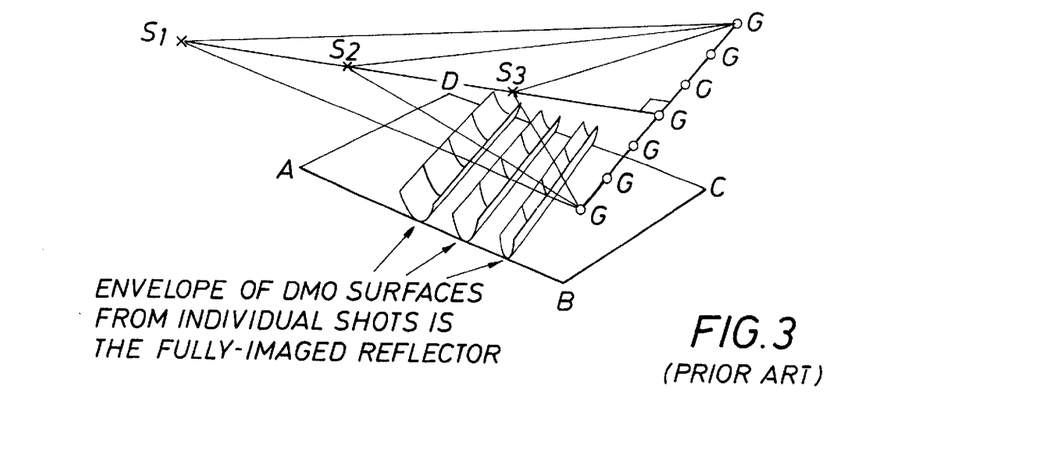
FIG. 3 depicts the response of a seismic event on several traces acquired from sources $S_1, S_2$, and $S_3$ fired into a line of receivers G, after DMO has been performed. It can be seen from FIG. 3 that the DMO channels from several shots will combine to sweep out and fully image reflector ABCD.

An intuitive example of a minimal data set: Consider the surface generated when an event on a single seismic trace is migrated (or DMO'd). This surface will be tangent to the reflector at some point. In order to actually define the reflector, we need to have the point of tangency move in two dimensions over the reflector surface. For example, FIG. 1 shows the DMO output of an event on a single seismic trace and a plane (ABCD) which represents the reflector. The DMO output, which can be thought of as a wire, will be tangent to the plane at one point. Next consider the DMO wires generated by a suite of traces—namely the traces recorded by a line of receivers from an offset shot (FIG. 2). The tangency points of these DMO wires lie along a line on the reflector surface. Finally, consider a series of shots fired into the same line of receivers (FIG. 3). Only three shots are shown, but you can imagine many shots in a line perpendicular to the line of receivers. Clearly, the DMO wires now have tangency points that move "continuously" in two dimensions over the reflector surface and it is easy to visualize that the DMO output of this crossed spread will, in fact, image the reflector (at least over part of its extent).

The seismic data from a well-sampled orthogonal crossed spread is a good example of what we mean by a minimal data set. However, minimal data sets include more than well sampled simple orthogonal crossed spreads. Other examples of minimal data sets follow, together with a technique which can be utilized to design a seismic survey composed of minimal data sets.

Our crossed spread example shows in an intuitive way how traces that vary widely in azimuth can combine to image reflectors, provided certain conditions are met. It is not hard to see that the above arguments can be extended from DMO to migration, with or without DMO, in time or depth. The important point is that the migration of an event on a single trace generates a surface that still has only one point of tangency with the fully imaged reflector.

A generalization of the idea of a crossed spread is a minimal data set which we now further define as a single-fold data set that can be used by DMO (or migration) to effectively image a reflector. Clearly, the data should be well sampled, and afford coverage over a reasonable area of the reflector. Other important features of a minimal data set are:

1) all points on the imaged part of the reflector should be tangent to a DMO wire;
2) only one wire should be tangent at each point;
3) there should not be any abrupt changes in the density, offset, or orientation of the DMO wires.

The first feature above assures that some part of the reflector is indeed defined by the minimal data set; the second feature is just the requirement of single-fold coverage and ensures that a bad velocity will not cause destructive interference or multiple images of the reflector; and the third ensures that artifacts (like "rooster tails") or the distortions described by Canning and Gardner in their July 1996 "The Leading Edge" article, which is hereby incorporated by reference, are not generated by DMO.

The key to producing good images of the subsurface is to avoid the irregularities by the use of well-sampled minimal data sets. We believe it is possible, using overlapped minimal data sets, to acquire wide-azimuth data with adequate fold and coverage in a cost-effective manner.

Four other examples of minimal data sets include the zero-offset data set, the common-offset gather utilized in an ideal marine acquisition geometry, a single shot fired into an areal receiver spread, and non-orthogonal cross spreads.

An analytical view of a minimal data set: Each trace in a 3-D survey can be described in terms of four coordinates—two shot coordinates and two receiver coordinates (elevation coordinates are ignored in this discussion). Each trace can thus be represented as a point in the 4-D space of the four trace coordinates. Note that, as will be shown for the five cited examples, traces in an ideal minimal data set lie on a 2-D hyperplane in the 4-D trace coordinate space. For example, in the case of common-offset minimal data sets underlying an ideal marine acquisition geometry with no cable feather, trace coordinates would satisfy two relations like $$x_s - x_g = 2h$$

and $$y_s - y_g = 0$$

where 2h is the shot-receiver offset, x and y denote spatial coordinates, and s and g denote shot and receiver respectively. Thus for each common-offset gather, the trace coordinates lie on the 2-D hyperplane satisfying the above linear relations. An orthogonal crossed spread might be described by the equations $$x_g = 0$$

and $y_g=0$ while a single shot into an areal receiver might satisfy the equations $x_s=0$ and $y_s=0$ demonstrating that in all five cases the traces in a minimal data set lie on a 2-D hyperplane in the 4-D space of trace coordinates.

One might conjecture the converse of this result: When traces in a data set lie on a 2-D hyperplane and are sufficiently dense, we have a minimal data set as required for our invention. However, we must warn that all data sets that fit this criterion are not good minimal data sets, which can be used in our invention. For example, consider a minimal data set consisting of a highly oblique crossed spread; such a data set degenerates in the limit to a single 2-D seismic line, which is not a minimal data set since it can give multifold coverage along a line rather than single-fold coverage over an area.

B. Diagnostic for Designing a Seismic Survey Which Decomposes Into Minimal Data Sets or for Determining Whether an Acquired Survey Approximates a Collection of Minimal Data Sets Which Can be Used in the Invention Approximations to minimal data sets: Practical considerations, or cost, may dictate some departure from the ideal geometries considered so far. The observation made above on how the traces in a minimal data set distribute themselves in the 4-D trace coordinate space provides a technique and criterion that can be utilized to judge how well a data set conforms to the notion of a minimal data set and can be utilized to design seismic surveys that will lead to minimal data sets (or data sets that are optimized so that they can be utilized in our invention as if they were minimal data sets.). For instance, we may wish to see how closely a common-offset data set extracted from a 3-D marine survey resembles a minimal data set. Cable feather and platform avoidance are two common reasons why this data set may not precisely represent a minimal data set.

Given all traces belonging to an ideal minimal data set, it can be shown that the minimal data set hyperplane in the 4-D space of trace coordinates is orthogonal to the eigenvectors of the two smallest eigenvalues of the covariance matrix of the trace coordinates. In fact, the four eigenvectors of this covariance matrix can be used to define a rotation of the coordinate axes such that two postrotation coordinates represent the trace coordinates in the minimal data set hyperplane and two represent the off-plane coordinates. If the coordinates of the traces all lie precisely on the minimal data set hyperplane, the latter two coordinates would be zero (or constant) for all traces. If the minimal data set is not perfect (e.g., we have common-offset marine data with variable cable feather), the off-plane coordinates would show some variability and the in-plane coordinates would not in general lie on a uniform grid. A useful diagnostic plot shows all four minimal data set coordinates as a tadpole: the coordinates of the head of the tadpole represent the in-plane coordinates of the trace, while the tail represents the vector defined by the off-plane components. Graphing the coordinates in a tadpole display in this manner provides a direct visual indication of the quality of the acquired data set and how close it approximates an ideal minimal data set. An acquired data set that is useful in this invention should be readily sortable into minimal data sets that can be processed according to the methods described herein.

When such displays are created for candidate minimal data sets extracted from data acquired with a geometry similar to that shown in FIG. 2 of the Canning-Gardner article referred to above, the results can be quite dramatic. If we pick, as a candidate set, the data from shots zigzagging along approximately a 45° line, fired into a single line of receivers, we get a display showing tadpoles of relatively modest size. (If the shots were exactly along this 45° line, the data set would be exactly a minimal data set, and the tadpoles would have no tails at all.) On the other hand, a candidate data set consisting of all traces with approximately the same absolute offset produces tadpole tails that overwhelm the plot and so would be quite inferior from an imaging standpoint.

While in an ideal case, the traces in a minimal data set lie on a 2-D hyperplane in the 4-D trace coordinate space, it is not mandatory for adequate imaging of the subsurface. For proper imaging of the primary data via a Kirchhoff-type migration operator, we just need to have a well defined Jacobian. Subject to the traces being sufficiently dense, as long as the traces lie on a surface that undulates gently at wavelengths long compared to the Fresnel zone, good images should be possible. On a tadpole plot, this would be evidenced by tadpoles that vary relatively slowly with position.

C. Processing of Minimal Data Sets

So far we have mainly discussed the imaging aspects of minimal data sets. We will touch briefly on several other issues regarding the processing of such data sets, and also some peculiarities. Preferably, sensible weighting and infilling of data are best done after the data has been sorted into minimal data sets. Imaging will generally be successful if there are well-sampled minimal data sets underlying the data and if the weighting, tapering, and other processing techniques carried out in steps 4a–4e of FIG. 5 take account of this fact.

An issue closely tied to the above discussions (regarding approximations to minimal data sets) is the issue of regularization and interpolation. We believe this should be done in the domain of the acquisition coordinates, and aimed towards the development of well-sampled minimal data sets. In our view, this goal provides a rational framework for the whole regularization/interpolation process. The pitfall to avoid, if at all possible, is the interpolation of binned data where traces with azimuths that differ greatly may be juxtaposed.

Certain types of noise will also be well organized on a minimal data set and can thus be filtered out of minimal data sets by filtering techniques known in the art for elimination of organized noise. It is preferable to remove such noise after the data has been sorted into minimal data sets, but prior to migration.

Some minimal data sets only define a reflector over a part of its extent. The situation is analogous to the migration of shot gathers in 2-D. In the latter case, the traces near the ends of the active receiver, spread are usually tapered to avoid seams in the middle of the data and to get more uniformity in the amplitudes. Similarly, in the case of a crossed spread, it is advisable to taper the traces from the shots and receivers at the ends of their respective ranges before migrating them and combining with other crossed spreads; if weighting of the near offsets is needed to better suppress multiples, this too should be done before the data are migrated. Also, the crossed spreads themselves should be regularly spaced and overlapped, so that the fold of the data is maintained with little variability over the area of interest.

Inextricably linked with imaging is the question of velocity analysis. With narrow-azimuth data (such as is acquired in a convention seismic shoot), it is usual to test for correct velocity by verifying that the depths of an event on different migrated common-offset panels are the same. Analogously for minimal data sets, a test for a correct migration velocity is that an event appears at the same depth on different migrated minimal data sets. Velocity updating can, in principle, be done using picks made on minimal data sets. If picking is to be done in the common reflection point domain, the labeling and ordering of the traces from various migrated minimal data sets contributing to an output location is an issue, since a minimal data set will not generally have a unique offset associated with it. Usually, there will at least be a natural ordering, based upon how the minimal data sets are located on the ground, but this will be an ordering in two dimensions, which may be inconvenient.

We have developed a technique (listed as step 4d of FIG. 5) for sorting prestack migration gathers constructed from minimal data sets that allows us to estimate residual moveout ("RMO") for such data sets. The technique involves using prestack migrated gathers ordered by surface location and pseudo offset to estimate RMO. This pseudo offset is the offset for the trace in the minimal data set with the reflection point at the output location for zero dip. Following is a description of the technique and a description of how to calculate the pseudo offset:

Ordering of Traces in Pre-stack Migrated Gathers Constructed from Minimal Data Sets In the current invention, a migration velocity diagnostic is performed using pre-stack migrated gathers at a single surface (output) location. Each trace in such a panel is an image of the subsurface obtained by the migration of a subset of the input data. The subset chosen is the minimal data set. Migrated events on traces ordered by pseudo-offset within a pre-stack migrated gather at a single output location will be flat for the correct migration velocity and have hyperbolic moveout for small velocity errors and small dips.

The value for the pseudo-offset depends only on the position of the minimal data set migrated relative to the surface (output) location and upon the geometry of the minimal data set. The derivation of the pseudo-offset for the minimal data set is simply the derivation of the migrated depth Zmig from a single minimal data set input subset for a single dipping reflector at depth Zmod in a homogeneous medium with constant velocity Vmod when the migration velocity is in error. The exact analytic equations are intractable, but they can be solved through arbitrary order in the velocity error U and dip. The expressions for the migrated depth for different minimal data set geometries all have the same form through first order in the velocity error and dip, namely $$Z_{mig} = Z_{mod}\left(1 + \frac{1}{2}\left(\frac{V_{mod}}{U}\right)^2\right) + \frac{1}{2Z_{mod}}\left(\frac{Vmod}{U}\right)^2 \hat{X}^2$$

$$\frac{1}{U^2} = \frac{1}{V_{mod}^2} - \frac{1}{V_{mig}^2}$$

where the pseudo-offset "X-hat" depends on the geometry of the minimal data set but is independent of the other model parameters. Taking the origin of coordinates at the migration output point, the pseudo-offset for several common minimal data set geometries are Common-offset and Common-azimuth $$\hat{X}^2 = \frac{(X_R - X_S)^2 + (Y_R - Y_S)^2}{4}$$

Orthogonal Cross Spread $$\hat{X}^2 = x_c^2 + y_c^2$$

Slash Cross Spread $$\hat{X}^2 = x_c^2 + y_c^2 + 4y_c \cot \alpha (y_c \cot \alpha - x_c)$$

Rectangular Patch $$\hat{X}^2 = x_c^2 + y_c^2$$

where (Xc,Yc) are the coordinates of the center of the minimal data set and alpha is the angle between the shot line and the receiver line for a slash cross-spread.

Figure 6:
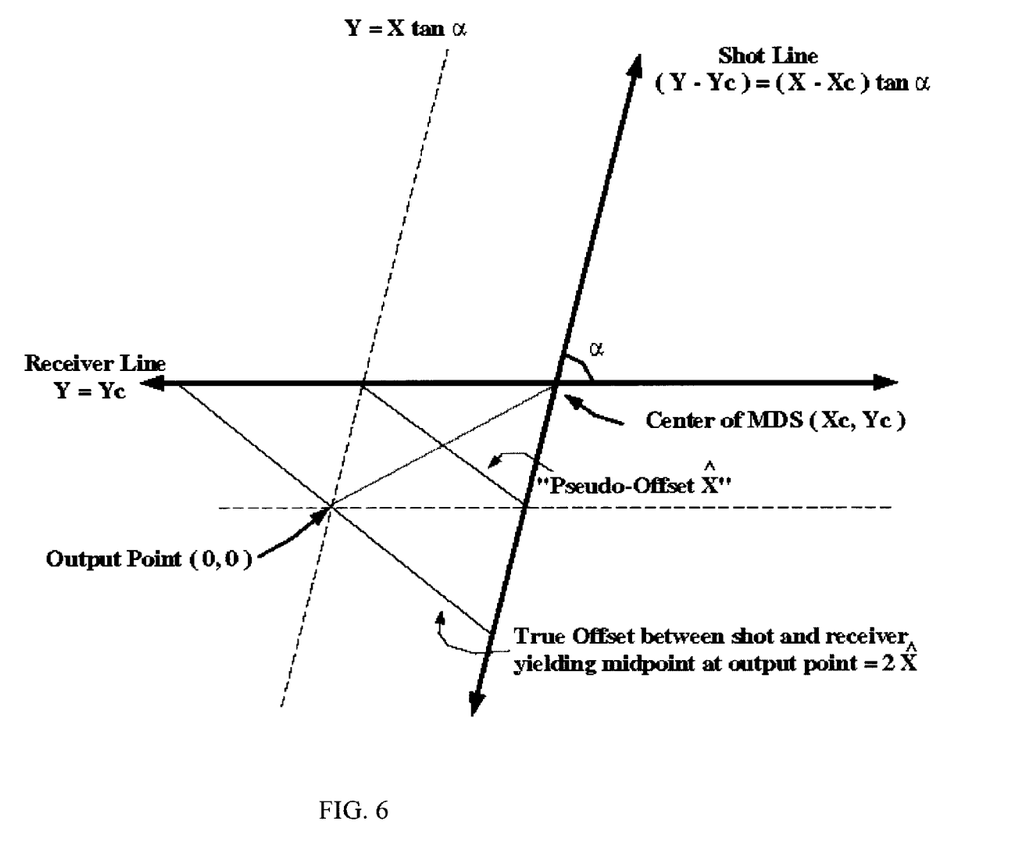
FIG. 6 is a diagram showing the interpretation of pseudo-offset for a slash cross-spread geometry. The pseudo-offset depends on the position of the minimal data set relative to the surface (output) point and on the geometry of the minimal data set. The pseudo-offset is proportional to the offset for the specular ray for flat dips.

An instructive geometric interpretation of the pseudo-offset is shown for a non-orthogonal cross spread in FIG. 6. In FIG. 6, the projections of the output point onto the axes of the minimal data set form a parallelogram. The distance from the center of the minimal data set to the output point is the longer diagonal of the parallelogram in this particular example. The other diagonal of the parallelogram is the pseudo-offset.

SYNTHETIC EXAMPLES

Figure 7:
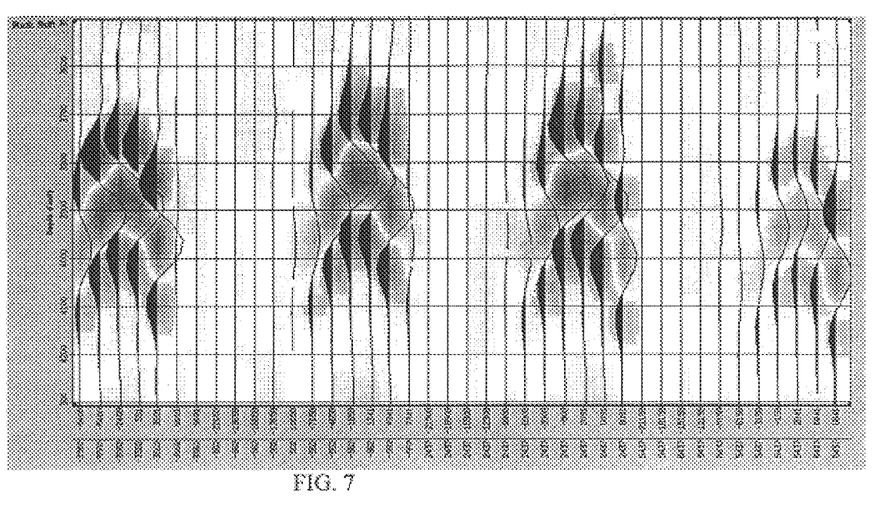
FIG. 7 is seismic panel or gather showing synthetic slash cross-spread migrated output traces at a single surface location arranged by the position of the center of the cross-spread. The horizontal axis labels at the bottom of the plot are: X distance from the migration output point to the center of the cross-spread, and Y distance from the migration output point to the center of the cross-spread.

These analytic results are confirmed by computer modeling. Migrated traces were generated for a slash geometry with tan(alpha)=4 over a flat reflector at T0=2.0 seconds in a Vmod=9400 ft/sec medium. The migration was performed with Vmig=10000 ft/sec. FIG. 7 shows the migrated output traces at a single output location ordered by the (X,Y) coordinates of their centers. Although these traces can be seen to be sensitive to velocity errors, they are difficult to interpret in terms of a hyperbolic moveout. The difficulty in interpreting these minimal data set migrated output traces, due to the lack of a reasonable ordering scheme for their traces, has been one of the primary impediments to their use.

Figure 8:
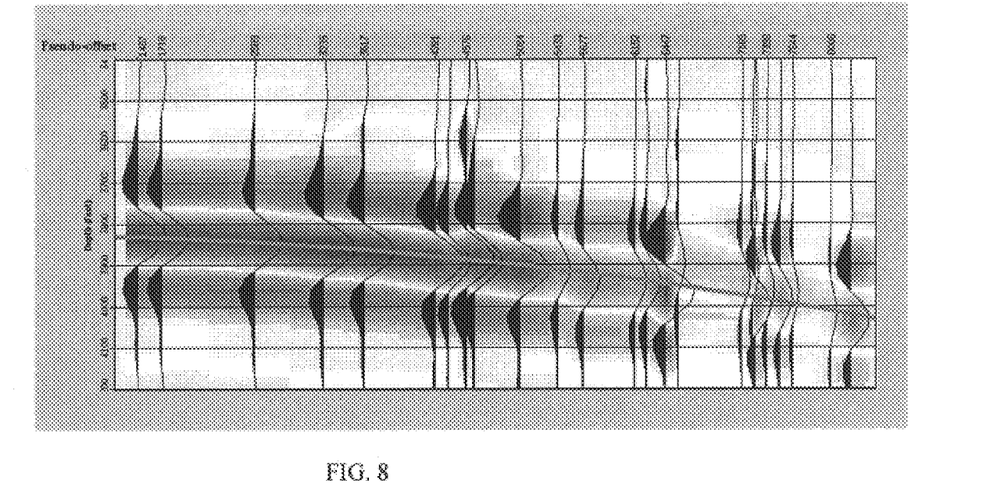
FIG. 8 is a seismic panel or gather showing synthetic slash cross-spread migrated output traces at a single surface location sorted by pseudo-offset. As can be seen from FIG. 8, the residual moveout ("RMO") depicted in this panel is hyperbolic.

In FIG. 8, the same migrated output traces are sorted by the "pseudo-offset." The moveout is indeed hyperbolic, as is confirmed by the hyperbola (from the analytic formula previously described) overlaid on the traces. Weak traces should be ignored, because the stationary phase point does not lie within the local coverage of those particular minimal data sets.

One of ordinary skill in the art can use a gather, where the minimal data set images are sorted by surface (output) location and pseudo-offset, such as the gather shown in FIG. 8, to calculate a RMO. The calculated RMO is then used to update the migration velocity (as shown in step 4e of FIG. 5) and steps 4c through 4e are repeated until the migration velocity converges to a satisfactory value.

After a satisfactory migration velocity has been obtained, the individual prestack migrated gathers are stacked to form a final image (step 6 of FIG. 5).

It should be appreciated that various other embodiments of the invention will be apparent to those skilled in the art through modification or substitution without departing from the spirit and scope of the invention as defined in the following claims. For example, DMO may be performed on single fold data sets that approximate minimal data sets prior to stack, with migration being performed post stack. It is believed that processing the data in such a manner will result in many of the advantages provided by the embodiments described above.

We claim:

1. A method for processing 3D seismic data acquired with land-like geometries, the method comprising:
   (a) sorting the seismic data into single fold data sets which approximate minimal data sets; and
   (b) DMO or migrating the single fold data sets to form minimal data set images.

2. The method of claim 1, further comprising:
   (c) sorting the minimal data set images obtained in step (b) into gathers by surface location; and
   (d) determining a residual moveout using the gathers formed in step (c).

3. The method of claim 1, further comprising:
   (c) sorting the minimal data set images obtained in step (b) into gathers by surface location and pseudo offset.
   (d) using the gathers formed in step (c) to update a migration velocity utilized in step (b), and repeating steps (b), (c) and (d).

4. The method of claim 2, comprising the additional step of:
   (e) using the residual moveout determined in step (d) to update a migration velocity utilized in step (b), and repeating steps (b), (c) and (d).

5. A method for processing seismic data, the method comprising:
   (a) sorting the seismic data into single fold data sets which approximate minimal data sets;
   (b) migrating the single fold data sets to form minimal data set images;
   (c) sorting the minimal data set images obtained in step (b) into gathers by surface location and pseudo offset; and
   (d) determining a residual moveout using the gathers formed in step (c).

6. The method of claim 5, comprising the additional step of
   (e) using the residual moveout determined in step (d) to update a migration velocity utilized in step (b), and repeating steps (b), (c), and (d).

7. The method of claim 6, wherein steps (e), (b), (c), and (d) are repeated until a desired value for residual moveout is obtained.

8. The method of claim 7, wherein the final gathers from step (c) are stacked to form a final image.

9. The method of claim 8, wherein the seismic data was acquired using a slash cross spread acquisition geometry.

10. The method of claim 8, comprising the additional step of tapering the seismic data in the single fold data sets prior to the single fold data sets being migrated in step (b).

11. The method of claim 8, comprising the additional step of infilling additional seismic data into the single fold data sets, prior to the single fold data sets being migrated in step (b).

12. The method of claim 8, comprising the additional step of filtering the single fold minimal data sets to remove organized noise.

13. A method for processing seismic data acquired using land like geometries, the method comprising:
   (a) acquiring a three dimensional seismic data set;
   (b) sorting the seismic data into single fold data sets which approximate minimal data sets;
   (c) migrating the single fold data sets to form minimal data set images;
   (d) sorting the minimal data set images obtained in step (c) into gathers by surface location and pseudo offset; and
   (e) determining a residual moveout using the gathers formed in step (d).

14. The method of claim 13, wherein the seismic data was acquired using a slash cross spread acquisition geometry.

15. The method of claim 13, wherein the seismic data was acquired using a rectangular patch acquisition geometry.

16. The method of claim 13, wherein the seismic data was acquired using a orthogonal cross spread acquisition geometry.

17. A method for determining to what extent an acquired seismic survey, comprised of traces, each trace having a corresponding shot and receiver, can be decomposed into approximate minimal data sets, the method comprising the steps of:
   (a) subdividing the survey into subsets;
   (b) plotting the shot coordinates and receiver coordinates for each trace within a subset formed in step (a) within a four dimensional coordinate space; and
   (c) evaluating whether a subset formed in step (a) approximate minimal data sets.

18. The method of claim 17, wherein a subset approximates a minimal data set when the traces are sufficiently dense and the trace coordinates lie on a surface that undulates slowly at wavelengths long compared to the Fresnel zone.

19. The method of claim 17, further comprising repeating step (b), until the coordinates for the traces within all subsets formed in step (a) have been plotted.

20. The method of claim 19, wherein step (c) is repeated until all the subsets formed in step (a) have been evaluated.

21. The method of claim 17, wherein it is determined that a subset does not approximate a minimal data set, and the method further comprises the step of:
   (d) acquiring additional seismic data that when used with the acquired seismic survey will result in a new seismic survey that can be decomposed into approximate minimal data sets.

* * * * *